S. OTIS.
DROP BOTTOM DUMP CAR.
APPLICATION FILED JULY 18, 1907.
Reissued Nov. 21, 1911. 13,320.
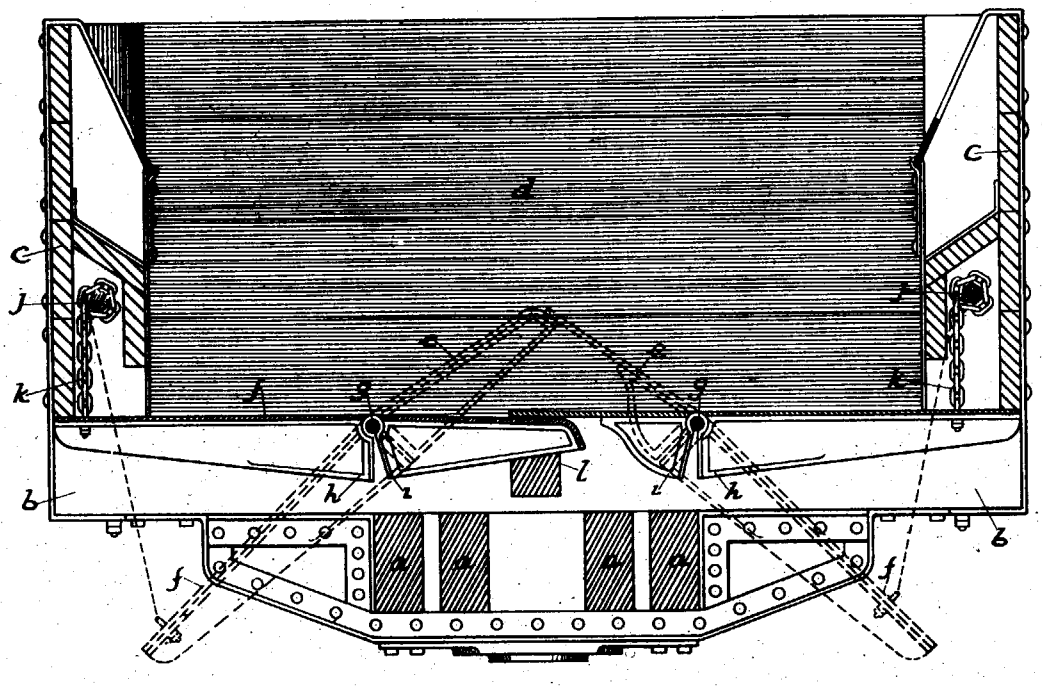
WITNESSES:
A. K. Davis
J. A. MacEdward.
INVENTOR.
Spencer Otis
BY
Sheridan & Wilkinson
ATTORNEYS.

UNITED STATES PATENT OFFICE.

SPENCER OTIS, OF CHICAGO, ILLINOIS, ASSIGNOR, BY MESNE ASSIGNMENTS, TO NATIONAL DUMP CAR COMPANY, A CORPORATION OF MAINE.

DROP-BOTTOM DUMP-CAR.

13,320. Specification of Reissued Letters Patent. Reissued Nov. 21, 1911.

Original No. 780,762, dated January 24, 1905, Serial No. 238,224. Application for reissue filed July 18, 1907. Serial No. 384,488.

*To all whom it may concern:*

Be it known that I, SPENCER OTIS, a citizen of the United States, residing at Chicago, in the county of Cook and State of Illinois, have invented certain new and useful Improvements in Drop-Bottom Dump-Cars, of which the following is a specification.

The principal object of the invention is to provide a simple, economical, and efficient drop-bottom dump-car with means by which all of the load therein may be automatically discharged.

The invention consists in a drop-bottom car in which there are combined a supporting framework and a counterbalanced drop-bottom therefor.

The invention consists further in a drop-bottom car in which there are combined a supporting-framework and a drop-bottom therefor formed of a plurality of swinging sections having independently-movable rear and front portions pivotally secured in position to each side of the longitudinal center of the car.

The invention consists, further and finally, in the features, combinations, and details of construction hereinafter described and claimed.

In the accompanying drawing the figure represents a cross-sectional elevation of a car as it appears when constructed in accordance with these improvements.

In constructing my improved car I prefer to use a supporting-framework consisting of a plurality of longitudinal sills *a*, centrally disposed, and a plurality of transverse deck-beams *b* resting thereon and secured thereto in any desired or convenient manner, thus dispensing with all side sills below the upper level of the deck-beams and providing a free and unobstructed discharge-opening, as will more fully hereinafter appear. Secured to this supporting-framework are side-boards *c* and end-boards *d*, which form the sides and ends of a gondola or other car requiring side and end boards or walls.

To form a flat-bottom car which will also be a drop-bottom car, a plurality of swinging sections is provided and pivotally secured in position to each side of the longitudinal center of the car and above the longitudinal sills. These swinging sections are formed of rear portions *e* and front portions *f*, independently and movably mounted upon the same pivotal points or shafts *g*. It will be noticed upon examination of the drawings that where the parts are laid in a flat plane the rear portions engage or overlap each other and the forward portions extend forward to the extreme sides of the car. In opening, the forward portion is first released and drops part way to discharge a portion of the load. Then the heel *h* of its bracket contacts the forward portion or adjacent wall of the bracket *i* of the rear part and assists to move or raise such part during the discharging of the remaining load to an A-shaped discharging position. To open and close these doors, rock-shaft mechanisms *j* are provided, which, by means of the chains *k*, are connected to the free ends of the swinging sections and used in the ordinary manner to open and close such doors.

A stop-block *l* is provided, as shown particularly in the drawings, and arranged between the deck-beams so as to permit one of the rear swinging sections to contact and rest on the same when in its flat position, and thus assist in carrying the load.

I claim:

1. In a drop-bottom dump-car, the combination of a supporting-framework, and a drop-bottom therefor formed of a plurality of swinging sections having independently movable rear and front portions pivotally secured in position to each side of the longitudinal center of the car and adapted to counterbalance each other, substantially as described.

2. In a drop-bottom dump-car, the combination of a supporting-framework, a drop-bottom portion formed of a plurality of swinging sections having independently-movable rear and front portions pivotally secured in position at each side of the longitudinal center of the car and adapted to counterbalance each other, and shaft mechanisms—one arranged at each side of the longitudinal center of the car upon which such swinging sections are pivotally mounted, substantially as described.

3. In a drop-bottom dump-car, the combination of a supporting-framework provided with upwardly-extending side and end boards, and a drop-bottom therefor formed of a plurality of swinging sections pivotally secured to the framework of the car at each side of the longitudinal center and adapted to counterbalance each other, each swinging section being formed of two independently-movable portions—rear overlapping portions and forwardly-extending portions arranged to form a flat-bottom gondola car in closed position and substantially A-shaped discharging portions in open position, substantially as described.

4. In a drop-bottom dump-car, the combination of a supporting framework, and a drop bottom therefor having a minor portion thereof arranged to act as a counterbalance to the major portion and adapted to have a limited relative movement thereto.

5. In a drop bottom dump car, a hinged rod, a door section consisting of two parts pivoted on and extending in opposite directions from said rod, said parts having coacting stops spaced apart to permit one part of said section a limited independent movement prior to communicating movement to the other part.

6. In a drop bottom dump car, two floor sections each pivoted on an axis intermediate its boundaries and divided into two portions separately pivoted on said axis, and means for limiting the relative movements of said portions of each section, said means being also adapted to enable one portion to counterbalance the other portion.

7. In a drop bottom dump car, two floor sections, each having a minor portion adapted to counterbalance the major portion and adapted to have a limited movement relative thereto, and means for supporting said minor portions in their normal positions as a part of the car floor.

8. In a drop bottom dump car, two floor sections, each having a minor portion adapted to counterbalance the major portion and adapted to have a limited movement relative thereto, and means for supporting said minor portions in the same plane with the major portions when said sections are in their closed positions, said minor portions being in contact in both their closed and their open positions.

SPENCER OTIS.

Witnesses:
E. M. ANDERSON,
A. L. SAVOIE.

Copies of this patent may be obtained for five cents each, by addressing the "Commissioner of Patents, Washington, D. C."